Inventors
JOSEPH A. W. MILLS
& WILLIAM A. TAMBLIN
By Reynolds, Beach &
Christensen Attorneys

United States Patent Office 2,760,400
Patented Aug. 28, 1956

2,760,400
BOLT HEAD WITH ATTACHED TRIANGULAR SHAPED SEALING RING

Joseph A. W. Mills, Leckhampton, and William A. Tamblin, New Milton, England, assignors to Dowty Seals Limited, Cheltenham, England, and The De Havilland Aircraft Company Limited, Hatfield, England Application November 14, 1951, Serial No. 256,272

Claims priority, application Great Britain November 21, 1950

1 Claim. (Cl. 85—9)

This invention relates to fastening means having countersunk heads, such as screws, bolts, rivets, or the like, which will hereinafter be referred to generally as screws.

The main object of the invention is to provide a simple but effective form of fluid-tight seal between the head of the screw and an article into which it is inserted, which nevertheless will not introduce the possibility of looseness of the screw nor its head relative to the hole wherein it fits, notwithstanding the use as the sealing material of a rubber-like ring which is usually considered to be resilient.

The invention is illustrated in the accompanying drawings, in which.

Figure 1:
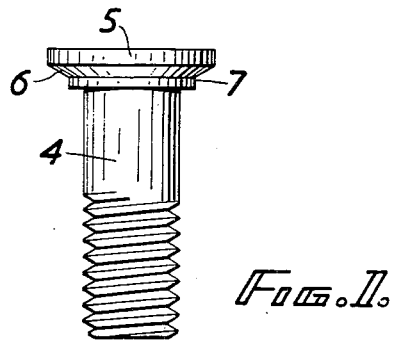
Figure 1 is an elevation of a screw.

In the drawings, a countersunk screw 4 is shown having a head 5 with a tapered conical under surface 6. A ring 7 of rubber or like material having a triangular cross-section, encircles the neck of the screw 4, with the longer side of the triangular section bonded to the inner part of the tapering surface 6 of the head 5 and terminating inwardly at the junction of the head 5 with the shank. The ring 7 is preferably a right-angle triangle in section as shown in Figures 1 and 2 with the hypotenuse bonded to the head 5.

The ring 7 is formed and applied to the head 5 of the screw 4 in the following manner. The inner annular surface of the head 5 to which the ring 7 is to be applied is given a coating of a suitable bonding agent. A ring of uncured rubber or like material is then placed around the neck of the screw 4, and the screw is placed in a mould having a bore which receives the shank of the screw 4 as a close sliding fit. The upper end of the bore is stepped to form the mould surface for the ring 7. Pressure is then applied to force the screw down into the mould and the mould is subjected to heat. The rubber or like material is thus caused to fill the mould space and the surplus material will ooze out between the upper outer edge of the mould and the tapering suface of the head 5 of the screw 4. It is found that said edge of the mould tends to cut the rubber or like material when it engages the tapering surface of the head 5 so that any surplus moulding material forms a flash which can be easily removed. Moreover, there is little tendency for a moulding flash to be formed on the shank of the screw 4.

Figure 2:
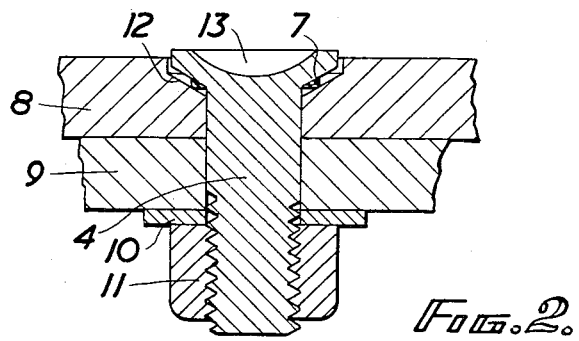
Figure 2 is a sectional view of two parts to be joined by the screw, before a nut on the end of the screw is tightened.
Figure 3:
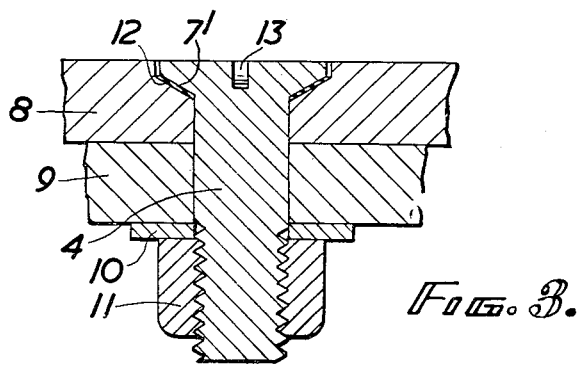
Figure 3 is a sectional view in a plane at right angles to that in Figure 1, after the nut on the end of the screw has been tightened; the sealing element is shown of exaggerated thickness in this figure.

A screw incorporating a sealing ring in accordance with the invention is particularly useful where a bracket or other member is to be secured to the boundary wall of a fluid or liquid container, and the manner of making such a connection is illustrated in Figures 2 and 3.

The screw 4 is inserted through registering holes in the wall 8 of a fluid container and an internal bracket or bracing member 9, and is fitted with a washer 10 and screw-threaded nut 11.

The wall 8 has a countersunk recess 12 which is complementary with the under-surface 6 of the screw head 5, and against which the angle of the ring 7 touches before the nut 11 is tightened on the screw 4, see Figure 2.

As the nut 11 is tightened, the material of the ring 7 spreads outwardly to form a thin fluid-tight sealing layer 7' whose thickness is somewhat exaggerated in Figure 3 in order to show its presence more clearly.

It is preferred to turn the nut 11 on the screw 4, rather than turn the screw 4 in the nut 11 so that the ring 7 will spread under compression without additional shear stresses. For this purpose the head 5 of the screw 4 has an arcuate slot 13, shown in different views in Figures 2 and 3, for the insertion of a screw driver or other holding tool by which the screw 4 is held stationary when the nut 11 is tightened on it.

We claim:

A screw or the like having a shank and a conically tapered head, for use in effecting a structural joint between a first element having a countersunk recess complemental to said tapered head, and a second element adjoining the first, and at the same time for use in cooperation with such countersunk recess to produce a non-leaking seal surrounding the screw, a ring of rubber-like material bonded to the tapered portion of the head about a narrow zone the inner edge whereof is located substantially at the junction of the head and the shank and the outer edge whereof is defined by a line located a minor fraction of the distance between such junction and the outer periphery of the head, said ring when unstressed being of generally right triangular cross-sectional shape, oriented so that its hypotenuse is bonded to the tapered portion of the head along said zone of bonding, one of its other sides lies substantially in a plane through said junction and perpendicular to the shank's axis, and its third side lies substantially in the cylindrical perimeter which includes the outer margin of said zone of bonding, said ring thus being thicker adjacent its outer periphery, there to come first into contact with the countersunk recess as the head is drawn thereinto, so that material from the thicker portion of the ring is squeezed primarily outwardly beyond the outer edge of the bonded zone as the head becomes fully seated in its recess, to constitute, with the material remaining in the bonded zone, a thin film substantially filling the entire interspace between the head and the recess.

References Cited in the file of this patent

UNITED STATES PATENTS

| | | |
|---|---|---|
| 1,888,459 | Greve | Nov. 22, 1932 |
| 2,250,343 | Zigler | July 22, 1941 |
| 2,326,455 | Gray | Aug. 10, 1943 |
| 2,550,357 | Jansen | Apr. 24, 1951 |
| 2,696,395 | Ellis | Dec. 7, 1954 |